(12) United States Patent
Nakayama

(10) Patent No.: US 7,381,784 B2
(45) Date of Patent: Jun. 3, 2008

(54) EPOXY GROUP-CONTAINING SILICON COMPOUND AND THERMOSETTING RESIN COMPOSITION

(75) Inventor: Koji Nakayama, Saitama (JP)

(73) Assignee: Nippon Kayaku Kabushiki Kaisha, Tokyo (JP)

( * ) Notice: Subject to any disclaimer, the term of this patent is extended or adjusted under 35 U.S.C. 154(b) by 238 days.

(21) Appl. No.: 10/542,718

(22) PCT Filed: Feb. 10, 2004

(86) PCT No.: PCT/JP2004/001395

§ 371 (c)(1),
(2), (4) Date: Jul. 20, 2005

(87) PCT Pub. No.: WO2004/072150

PCT Pub. Date: Aug. 26, 2004

(65) Prior Publication Data

US 2006/0135723 A1 Jun. 22, 2006

(30) Foreign Application Priority Data

Feb. 12, 2003 (JP) ............................ 2003-033244

(51) Int. Cl.
*C08G 77/08* (2006.01)
(52) U.S. Cl. .................. 528/14; 524/356; 524/361; 524/366; 524/367; 528/21; 528/40
(58) Field of Classification Search ............ None
See application file for complete search history.

(56) References Cited

U.S. PATENT DOCUMENTS

| | | | |
|---|---|---|---|
| 5,280,098 A | 1/1994 | Witucki et al. | 528/17 |
| 5,395,697 A * | 3/1995 | Morrison | 428/412 |
| 5,693,422 A * | 12/1997 | Basil et al. | 428/412 |
| 6,391,999 B1* | 5/2002 | Crivello | 528/12 |
| 2002/0123592 A1* | 9/2002 | Zhang et al. | 528/10 |
| 2003/0055193 A1* | 3/2003 | Lichtenhan et al. | 528/10 |
| 2003/0212228 A1* | 11/2003 | Dai et al. | 528/10 |
| 2005/0244658 A1* | 11/2005 | Bae et al. | 428/447 |

FOREIGN PATENT DOCUMENTS

| | | |
|---|---|---|
| EP | 0 652 245 | 8/2000 |
| JP | 3-47840 | 2/1991 |
| JP | 4-202325 | 7/1992 |
| JP | 6-2000032 | 7/1994 |
| JP | 6-287273 | 10/1994 |
| JP | 8-295736 | 11/1996 |
| JP | 10-324749 | 12/1998 |
| JP | 11-92665 | 4/1999 |
| JP | 2001-59013 | 3/2001 |
| WO | 02/057381 | 7/2002 |

* cited by examiner

*Primary Examiner*—Marc S. Zimmer
(74) *Attorney, Agent, or Firm*—Nields & Lemack

(57) ABSTRACT

The present invention relates to an epoxy group-containing silicon compound which is obtained by condensing at least one epoxy group-containing alkoxy silicon compound per se represented by the general formula (1a): $R_{1a}Si(OR_2)_3$, wherein $R_{1a}$ denotes a substituent having an epoxy group and $R_2$ denotes an alkyl group having at most 4 carbons, or said compound and at least one substituted alkoxy silicon compound represented by the general formula (1b): $R_{1b}Si(OR_3)_3$, wherein $R_{1b}$ denotes an alkyl group having at most 10 carbons, an aryl group or an unsaturated aliphatic residue and $R_3$ denotes an alkyl group having at most 4 carbons, in the presence of a basic catalyst.

4 Claims, 4 Drawing Sheets

EPOXY GROUP-CONTAINING SILICON COMPOUND AND THERMOSETTING RESIN COMPOSITION

TECHNICAL FIELD

The present invention relates to a novel epoxy group-containing silicon compound and a thermosetting resin composition containing said novel epoxy group-containing silicon compound which provides a cured product excellent in heat resistance which is used for various insulating materials for electrical and electronic parts, various composite materials such as laminated sheet (printed wiring board) and FRP (fiber-reinforced plastic), adhesives, paints, and the like.

BACKGROUND ART

An epoxy resin is excellent in heat resistance, electric properties, dynamic properties, and the like and therefore widely used in the fields of various electrical and electronic parts, structural materials, adhesives, paints, and the like. Furthermore, in accordance with recent development of electrical and electronic fields, request for an epoxy resin has been higher, and particularly improvement of heat resistance has been required.

As a means for improving heat resistance of an epoxy resin, there are a method of improving structure of the epoxy resin itself by increasing functional group density in the epoxy resin to increase cross-link density of the cured product or by introducing a stiff skeleton into the resin skeleton, and a method of filling fillers such as glass fibers, silica particles, and mica. However, such a means by structure improvement of the epoxy resin itself or addition of fillers or the like has not attained sufficient improvement effects.

A heat resistance improvement method other than structure improvement of the epoxy resin itself or addition of fillers or the like is disclosed in, for example, JP-A 2001-59013 publication. Said publication proposes a method of using an alkoxy group-containing silane-modified epoxy resin which is obtained by subjecting a bisphenol A type epoxy resin and a hydrolyzable alkoxysilane to dealcoholization reaction. However, with regard to this method, there is pointed out a problem that defects such as voids tend to be caused in the cured product due to the alcohol and water produced as by-products.

Furthermore, as a compound having in the molecule silicon and an epoxy group similarly to said alkoxy group-containing silane-modified epoxy resin, JP-A 10-324749 publication proposes a polyorganosiloxane having an epoxy group and the preparation process thereof. However, this process necessitates a step of end-capping a hydroxyl group and/or an alkoxy group at the main chain terminals in order to improve stability. Moreover, in order to obtain the target product, the process necessitates multiple steps of introducing a mercapto group in advance and subjecting the group and an epoxy group-containing ethylenically unsaturated compound to Michel addition reaction in the presence of a radical initiator, and is not efficient. In addition, heat resistance of the resultant epoxy group-containing polyorganosiloxane is not referred to.

DISCLOSURE OF THE INVENTION

Therefore, one of the objects of the present invention is to provide a thermosetting resin composition which gives the cured product excellent in heat resistance without depending on the conventional heat resistance improvement means.

Another object of the present invention is to provide a novel and stable epoxy group-containing silicon compound which can be one component of such a composition.

Another further object of the present invention is to provide a process for efficiently preparing such an epoxy group-containing silicon compound.

In order to solve the above-mentioned problems in the prior art, the present inventors have devoted themselves to research and thus have accomplished the present invention. That is, the present invention relates to the following constitutions.

(1) An epoxy group-containing silicon compound which is obtained by condensing at least one epoxy group-containing alkoxy silicon compound per se represented by the general formula (1a): $R_{1a}Si(OR_2)_3$, wherein $R_{1a}$ denotes a substituent having an epoxy group and $R_2$ denotes an alkyl group having at most 4 carbons, in the presence of a basic catalyst.

(2) An epoxy group-containing silicon compound which is obtained by condensing at least one epoxy group-containing alkoxy silicon compound represented by the general formula (1a): $R_{1a}Si(OR_2)_3$, wherein $R_{1a}$ denotes a substituent having an epoxy group and $R_2$ denotes an alkyl group having at most 4 carbons, and at least one substituted alkoxy silicon compound represented by the general formula (1b): $R_{1b}Si(OR_3)_3$, wherein $R_{1b}$ denotes an alkyl group having at most 10 carbons, an aryl group or an unsaturated aliphatic residue and $R_3$ denotes an alkyl group having at most 4 carbons, in the presence of a basic catalyst.

(3) The epoxy group-containing silicon compound as set forth in the above item (1) or (2), wherein $R_{1a}$ is a glycidoxy(C1-C3)alkyl group or an alkyl group substituted with a cycloalkyl group of 5-8 carbons having an oxirane group in each of said at least one epoxy group-containing alkoxy silicon compound represented by the general formula (1a).

(4) The epoxy group-containing silicon compound as set forth in the above item (2), wherein $R_{1b}$ is an alkyl group having at most 6 carbons or an aryl group in each of said at least one substituted alkoxy silicon compound represented by the general formula (1b).

(5) The epoxy group-containing silicon compound as set forth in the above item (2), wherein $R_{1a}$ is a glycidoxy (C1-C3)alkyl group or an alkyl group substituted with a cycloalkyl group of 5-8 carbons having an oxirane group in each of said at least one epoxy group-containing alkoxy silicon compound represented by the general formula (1a), and wherein $R_{1b}$ is an alkyl group having at most 6 carbons or an aryl group in each of said at least one substituted alkoxy silicon compound represented by the general formula (1b).

(6) A thermosetting resin composition containing (i) the epoxy group-containing silicon compound as set forth in any one of the above items (1)-(5) and (ii) a curing agent.

(7) The thermosetting resin composition as set forth in the above item (6), which further contains an epoxy resin other than the above-mentioned (i).

(8) The thermosetting resin composition as set forth in the above item (6) or (7), which further contains an accelerator and/or an organic solvent.

(9) A cured product obtained by curing the thermosetting resin composition as set forth in any one of the above items (6)-(8).

(10) A method for producing an epoxy group-containing silicon compound, which comprises condensing at least one epoxy group-containing alkoxy silicon compound per se represented by the general formula (1a): $R_{1a}Si(OR_2)_3$, wherein $R_{1a}$ denotes a substituent having an epoxy group and $R_2$ denotes an alkyl group having at most 4 carbons, in the presence of a basic catalyst.

(11) A method for producing an epoxy group-containing silicon compound, which comprises condensing at least one epoxy group-containing alkoxy silicon compound represented by the general formula (1a): $R_{1a}Si(OR_2)_3$, wherein $R_{1a}$ denotes a substituent having an epoxy group and $R_2$ denotes an alkyl group having at most 4 carbons, and at least one substituted alkoxy silicon compound represented by the general formula (1b): $R_{1b}Si(OR_3)_3$, wherein $R_{1b}$ denotes an alkyl group having at most 10 carbons, an aryl group or an unsaturated aliphatic residue and $R_3$ denotes an alkyl group having at most 4 carbons, in the presence of a basic catalyst.

(12) The method as set forth in the above item (10) or (11), wherein $R_{1a}$ is a glycidoxy(C1-C3)alkyl group or an alkyl group substituted with a cycloalkyl group of 5-8 carbons having an oxirane group in each of said at least one epoxy group-containing alkoxy silicon compound represented by the general formula (1a).

(13) The method as set forth in the above item (11), wherein $R_{1b}$ is an alkyl group having at most 6 carbons or an aryl group in each of said at least one substituted alkoxy silicon compound represented by the general formula (1b).

(14) The method as set forth in the above item (11), wherein $R_{1a}$ is a glycidoxy(C1-C3)alkyl group or an alkyl group substituted with a cycloalkyl group of 5-8 carbons having an oxirane group in each of said at least one epoxy group-containing alkoxy silicon compound represented by the general formula (1a), and wherein $R_{1b}$ is an alkyl group having at most 6 carbons or an aryl group in each of said at least one substituted alkoxy silicon compound represented by the general formula (1b).

BEST MODE FOR CARRYING OUT THE INVENTION

Figure 1:
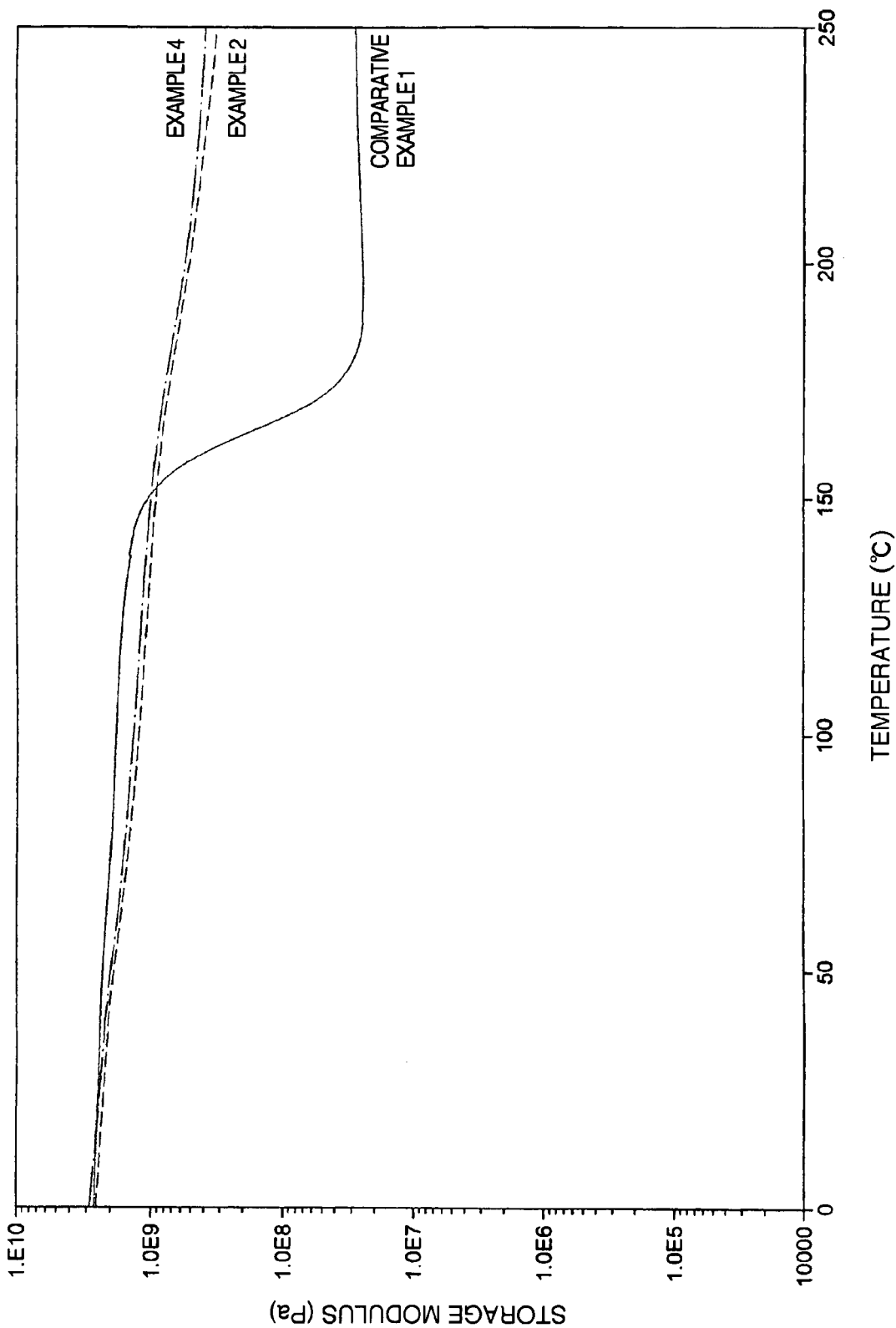
FIG. 1 shows evaluation results of heat resistance of the cured products obtained in Examples 2 and 4 and Comparative Example 1. The ordinate axis and transverse axis therein indicate dynamic storage elastic modulus and temperature, respectively.

Hereinafter, the best mode for carrying out the present invention is described, and "part" and "%" are based on weight, unless otherwise noted.

As mentioned above, the epoxy group-containing silicon compound of the present invention is obtained by condensing at least one epoxy group-containing alkoxy silicon compound per se represented by the general formula (1a): $R_{1a}Si(OR_2)_3$, wherein $R_{1a}$ denotes a substituent having an epoxy group and $R_2$ denotes an alkyl group having at most 4 carbons, in the presence of a basic catalyst, or by condensing at least one epoxy group-containing alkoxy silicon compound represented by the general formula (1a): $R_{1a}Si(OR_2)_3$, wherein $R_{1a}$ denotes a substituent having an epoxy group and $R_2$ denotes an alkyl group having at most 4 carbons, and at least one substituted alkoxy silicon compound represented by the general formula (1b): $R_{1b}Si(OR_3)_3$, wherein $R_{1b}$ denotes an alkyl group having at most 10 carbons, an aryl group or an unsaturated aliphatic residue and $R_3$ denotes an alkyl group having at most 4 carbons, in the presence of a basic catalyst. Herein, "at least one epoxy group-containing alkoxy silicon compound represented by the general formula (1a) . . . " and "at least one substituted alkoxy silicon compound represented by the general formula (1b) . . . " mean that only one kind of the compounds represented by these formulas may be used or a mixture of two or more kinds may be used. In addition, "per se" concerning condensation of the compound represented by the general formula (1a) means that without combining with the compound of the general formula (1b), condensation is carried out between the same molecules of a kind of compound of the general formula (1a) or between different molecules of two or more kinds of compounds of the general formula (1a).

As the epoxy group-containing substituent, $R_{1a}$ in the epoxy group-containing alkoxy silicon compound of the formula (1a) used in the present invention, there is no particular limitation so long as it is a substituent having an epoxy group, and there are cited glycidoxyalkyl groups of at most 4 carbons having oxyglycidyl group such as β-glycidoxyethyl, γ-glycidoxypropyl, and γ-glycidoxybutyl; glycidyl; alkyl groups substituted with cycloalkyl group of 5-8 carbons having oxirane group such as β-(3,4-epoxycyclohexyl)ethyl, γ-(3,4-epoxycyclohexyl)propyl, β-(3,4-epoxycycloheptyl)ethyl, β-(3,4-epoxycyclohexyl)propyl, β-(3,4-epoxycyclohexyl)butyl, and β-(3,4-epoxycyclohexyl)pentyl; and the like. Above all, preferable are glycidoxyalkyl groups wherein oxyglycidyl group is bonded to alkyl group of 1-3 carbons, and alkyl groups of at most 3 carbons substituted with cycloalkyl group of 5-8 carbons having oxirane group, for example, β-glycidoxyethyl, γ-glycidoxypropyl, β-(3,4-epoxycyclohexyl)ethyl, and the like.

Furthermore, as examples of $R_2$ in the epoxy group-containing alkoxy silicon compound of the formula (1a), there are cited alkyl groups of at most 4 carbons such as methyl, ethyl, n-propyl, i-propyl, n-butyl, i-butyl, and tert-butyl. Most preferably $R_2$ is methyl or ethyl from the viewpoint of reaction conditions such as compatibility, reactivity, and reaction yield.

As preferable specific examples of the compound of the formula (1a) having these substituents $R_{1a}$ and $R_2$ which can be used, there are cited β-glycidoxyethyltrimethoxysilane,
β-glycidoxyethyltriethoxysilane,
γ-glycidoxypropyltrimethoxysilane, γ-glycidoxypropyltriethoxysilane,
β-(3,4-epoxycyclohexyl)ethyltrimethoxysilane,
β-(3,4-epoxycyclohexyl)ethyltriethoxysilane,
and the like.

As examples of $R_{1b}$ in the substituted alkoxy silicon compound of the formula (1b) used in the present invention, there are cited an alkyl group having at most 10 carbons such as methyl, ethyl, propyl, butyl, pentyl, hexyl, heptyl, octyl, nonyl, or decanyl; an aryl group; and an unsaturated aliphatic residue such as methacryloyl group or acryloyl group. Preferably $R_{1b}$ is an alkyl group having at most 6 carbons or an aryl group.

Furthermore, as examples of $R_3$ in the substituted alkoxy silicon compound of the formula (1b), there are cited alkyl groups having at most 4 carbons such as methyl, ethyl, n-propyl, i-propyl, n-butyl, i-butyl, and tert-butyl. Most preferably $R_3$ is methyl or ethyl from the viewpoint of reaction conditions such as compatibility, reactivity, and reaction yield.

As preferable specific examples of the compound of the formula (1b) having these substituents $R_{1b}$ and $R_3$ which can be used, there are cited alkyltrialkoxysilanes such as methyltrimethoxysilane, methyltriethoxysilane, methyltripropoxysilane, methyltributoxysilane, ethyltrimethoxysilane, ethyltriethoxysilane, iobutyltrimethoxysilane, iobutyltriethoxysilane, n-propyltrimethoxysilane, n-propyltriethoxysilane, isopropyltrimethoxysilane, isopropyltriethoxysilane, decyltrimethoxysilane, and decyltriethoxysilane; and arylalkoxysilanes such as phenyltrimethoxysilane and phenyltriethoxysilane; and the like.

When among compounds of the formula (1b), compounds having the preferable substituents as mentioned above as $R_{1b}$ (or a combination of $R_{1b}$ and $R_3$) are used, improvements are found in the points of compatibility with other components in the thermosetting composition of the present invention to be hereinafter described and physical properties of the cured product of the composition.

When the epoxy group-containing alkoxy silicon compound of the formula (1a) and the substituted alkoxy silicon compound of the formula (1b) are used together in order to obtain the epoxy group-containing silicon compound of the present invention, it is possible to appropriately determine the proportion of the compound of the formula (1b) used in accordance with the desired physical properties of the cured product. That is, it is possible to use the compound of the formula (1b) in a proportion of usually not more than 95 mole %, preferably not more than 90 mole % based on the total moles of the compound of the formula (1a) and the compound of the formula (1b). When the proportion of the compound of the formula (1b) used is larger, heat resistance of the cured product tends to decrease. Therefore, when the cured product having high heat resistance is desired, the compound of the formula (1b) is used in a proportion of not more than 75 mole %, preferably about 70-5 mole % based on the total moles of the compound of the formula (1a) and the compound of the formula (1b). However on the other hand, when the proportion of the compound of the formula (1b) used is larger, there is the advantage that improvement is found in tackiness (stickiness degree) of the cured product. Furthermore, in this case, refractive index is higher, and it is possible to design cured products different in refractive index to desired extent, and hence they can be used for, for example, optical waveguide and the like.

The epoxy group-containing silicon compound of the present invention can be obtained by the condensation reaction in which the epoxy group-containing alkoxy silicon compound of the formula (1a) is used as an essential component, that is, can be obtained by condensing the compound (one kind or plural kinds) of the formula (1a) per se, or as necessary, the compound (one kind or plural kinds) of the formula (1a) and the substituted alkoxy silicon compound (one kind or plural kinds) of the formula (1b) in the presence of a basic catalyst. Furthermore, in order to accelerate condensation, water can be added as necessary. The amount of water added is usually 0.05-1.5 moles, preferably 0.07-1.2 moles based on 1 mole of alkoxy group of the entire reaction mixture. In addition, more preferably in the present invention, the compound (one kind or plural kinds) of the formula (1a) per se is condensed.

The catalyst used in the above-mentioned condensation reaction is not particularly limited, so long as it is basic, and it is possible to use an inorganic base such as an alkali metal hydroxide such as sodium hydroxide, potassium hydroxide, lithium hydroxide, or cesium hydroxide; an alkali metal carbonate such as sodium carbonate, potassium carbonate, sodium hydrogen carbonate, or potassium hydrogen carbonate; or the like; or an organic base such as ammonia, triethylamine, diethylenetriamine, n-butylamine, dimethylaminoethanol, triethanolamine, tetramethylammonium hydroxide, or the like. Among them, an inorganic base or ammonia is preferable particularly in the point that catalyst removal from the product is easy. The amount of catalyst added can be usually $5 \times 10^{-4}$-7.5%, preferably $1 \times 10^{-3}$-5% based on the total weight of the epoxy group-containing alkoxy silicon compound of the formula (1a) and the substituted alkoxy silicon compound of the formula (1b). When an alkali metal hydroxide or an alkali metal carbonate is used as a catalyst, the amount is preferably about 0.01-0.1%.

The above-mentioned condensation reaction can be carried out in a solvent or in no solvent. The solvent is not particularly limited, so long as it dissolves the epoxy group-containing alkoxy silicon compound of the formula (1a) and the substituted alkoxy silicon compound of the formula (1b). As such a solvent, there can be enumerated, for example, an aprotic polar solvent such as dimethylformamide, dimethylacetamide, tetrahydofuran, methyl ethyl ketone, or methyl isobutyl ketone; an aromatic hydrocarbon such as toluene or xylene; or the like. Among them, an aprotic polar solvent is preferable. The amount of a solvent used is not particularly limited so long as it is in the range where the reaction proceeds smoothly, but too much amount necessitates long time to be removed and makes working efficiency bad, and therefore it is used usually in about 80-150 parts based on 100 parts of the total weight of the compounds of the formula (1a) and the formula (1b).

The reaction is carried out by mixing the compound of the formula (1a) and if necessary the compound of the formula (1b) and a solvent, and heating the mixture to 40-140° C., and then adding a basic catalyst. In addition, the total amount of the basic catalyst may be added before heating. Furthermore, the basic catalyst can be added as a solid or an aqueous solution of about 0.05-0.3%, but preferably the aqueous solution is gradually dropped in order to prevent excess proceeding of the reaction. After completion of the dropping, the reaction is continued for 1-12 hours at 40-140° C., while removing alcohols produced by the reaction. In addition, it is possible to continue the reaction without removing the alcohols. After completion of the reaction, the product is washed until the used wash becomes neutral. In addition, when a solvent is used, the solvent is removed after washing under reduced pressure.

The weight average molecular weight of the epoxy group-containing silicon compound of the present invention thus obtained is preferably 400-50,000, more preferably 750-30,000, further preferably 1,200-10,000, particularly preferably about 2,000-7,000. When the weight average molecular weight is less than 400, improvement effect in heat resistance is lean. On the other hand, when it is larger than 50,000, deterioration of physical properties as the corresponding thermosetting composition such as descent of compatibility with other components and ascent of viscosity is caused, which is not preferable.

The epoxy group-containing silicon compound of the present invention is provided for various uses, and usually used as a thermosetting resin composition in combination with a curing agent. Furthermore, in applying the present silicon compound to various uses, it can be used together with various epoxy resins other than the epoxy group-containing silicon compound of the present invention in accordance with uses.

As a curing agent, usually, there can be used without particular limitation amine type compounds, amide type compounds, acid anhydride type compounds, phenol type compounds, imidazoles, Lewis acids, and the like which have been used as a curing agent for an epoxy resin. Specifically, there are cited amine type compounds such as diaminodiphenylmethane, diethylenetriamine, triethylenetetramine, diaminodiphenylsulfone, isophorone diamine, dimethylbenzylamine, tetraethylenepentamine, ketimine compounds, and guanidine derivatives; amide type compounds such as dicyandiamide, and polyamide resin synthesized from dimmer of linolenic acid and ethylene diamine; acid anhydride type compounds such as phthalic anhydride, trimellitic anhydride, pyromellitic anhydride, maleic anhydride, tetrahydrophthalic anhydride, methyltetrahydrophthalic anhydride, methylnadic anhydride, hexahydrophthalic anhydride, and methylhexahydrophthalic anhydride; phenol type compounds such as bisphenols, polycondensates of phenols (phenol, alkyl-substituted phenol, naphthol, alkyl-substituted naphthol, dihydroxybenzene, dihydroxynaphthalene, and the like) and various aldehydes, polymerization products of phenols and various diene compounds, polycondensates of phenols and aromatic dimethylols, condensates of bismethoxymethylbiphenyl and naphthols or phenols, biphenols and the modification products thereof; imidazoles such as imidazole; Lewis acids such as boron trifluoride-amine complex; and the like. The amount of a curing agent used is preferably 0.2-1.5 equivalents, particularly preferably 0.3-1.2 equivalents based on 1 equivalent of epoxy group in the composition. Furthermore, a tertiary amine such as benzyldimethylamine can be used as a curing agent, and the amount in using it is usually 0.3-20%, preferably 0.5-10% based on an epoxy group-containing compound.

The thermosetting resin composition of the present invention can contain an accelerator if necessary. As an accelerator there are cited, for example, imidazoles such as 2-methylimidazole, 2-ethylimidazole, and 2-ethyl-4-methylimidazole; tertiary amines such as 2-(dimethylaminomethyl)phenol, and 1,8-diaza-bicyclo(5,4,0)undecene-7; phosphines such as triphenylphosphine; metal compounds such as tin octanoate; quaternary phosphonium salts; and the like. An accelerator is used as necessary in an amount of 0.01-15 parts based on 100 parts of an epoxy group-containing compound in the composition.

When the epoxy group-containing silicon compound of the present invention is used together with the other epoxy resins in the thermosetting resin composition of the present invention, the proportion of the epoxy group-containing silicon compound of the present invention in all epoxy group-containing compounds is preferably at least 10%. The other epoxy resins which can be used, are not particularly limited, so long as they are epoxy resins which are usually used for electrical and electronic parts, and can be obtained usually by glycidylating a compound having two or more phenolic hydroxyl groups. As specific examples of usable epoxy resins, there are cited glycidylation products of bisphenols such as tetrabromobisphenol A, tetrabromobisphenol F, bisphenol A, tetramethylbisphenol F, bisphenol F, bisphenol S, and bisphenol K; or biphenols such as biphenol and tetramethylbiphenol; or hydroquinones such as hydroquinone, methylhydroquinone, dimethylhydroquinone, trimethylhydroquinone, di-tertiary butylhydroquinone; or resorcinols such as resorcinol, and methylresorcinol; or catechols such as catechol, and methylcatechol; or dihydroxynaphthalenes such as dihydroxynaphthalene, dihydroxymethylnaphthalene, and dihydroxydimethylnaphthalene; and glycidylation products of condensates between phenols or naphthols and aldehydes, or condensates between phenols or naphthols and xylylene glycol, or condensates between phenols and isopropenylacetophenone, or reaction products between phenols and dicyclopentadiene, or condensates between bismethoxymethylbiphenyl and naphthols or phenols; and the like. These are commercially available or can be obtained by known methods. These may be used alone or in a combination of two or more kinds.

Furthermore, to the thermosetting resin composition of the present invention there can be added various formulating ingredients such as filler of silica, alumina, glass fiber, talc or the like; mold releasing agent, pigment, surface treatment, viscosity modifier, plasticizer, stabilizer, and coupling agent as necessary.

Moreover, the thermosetting resin composition of the present invention can be used as a varnish by containing an organic solvent. As an organic solvent, there is no particular limitation so long as it dissolves each component of the composition, and there are cited, for example, toluene, xylene, acetone, methyl ethyl ketone, methyl isobutyl ketone, dimethylformamide, and the like. The cured product of the present invention may be obtained by impregnating the varnish dissolved in such an organic solvent into a base material such as glass fibers, carbon fibers, polyester fibers, polyamide fibers, alumina fibers, or paper, drying under heating to get a prepreg, and molding the prepreg by hot-pressing.

An organic solvent can be used in such an amount that the proportion of the organic solvent in the thermosetting resin composition can be usually 10-70%, preferably 15-65%.

The thermosetting resin composition of the present invention can be obtained by mixing each component uniformly. The thermosetting resin composition of the present invention can be easily changed into its cured product by a method similar to those which have been heretofore known. For example, an epoxy group-containing compound and a curing agent, and optionally an accelerator and other formulating ingredients as necessary are sufficiently blended until they become uniform by use of an extruder, a kneader, a roll or the like to obtain an epoxy resin composition. Thereafter, the epoxy resin composition can be molten and then casted or molded by use of a transfer molding machine, and furthermore can be heated for 2-10 hours at 80-200° C. to obtain the cured product.

EXAMPLES 1-13 AND COMPARATIVE EXAMPLE 1

The present invention is specifically described by way of working examples, but the present invention is not limited by them.

Physical property values in the working examples were measured by the following methods.
(1) Weight average molecular weight: was measured by GPC (gel permeation chromatography) method.
(2) Epoxy equivalent: was measured by a method pursuant to JIS K-7236.

EXAMPLE 1

94.4 parts of γ-glycidoxypropyltrimethoxysilane and 94.4 parts of methyl isobutyl ketone were charged in a reaction vessel and heated to 80° C. After heating, 21.6 parts of 0.1% potassium hydroxide aqueous solution was continuously dropped in 30 minutes. After completion of dropping, reaction was continued for 5 hours at 80° C. while removing the resulting methanol. After completion of the reaction, washing was repeated until the used wash becomes neutral. Then the solvent was removed under reduced pressure to obtain 67 parts of the epoxy group-containing silicon compound (A) of the present invention. The epoxy equivalent of the resultant compound was 166 g/eq., and the weight average molecular weight thereof was 3700. From $^1$H-NMR (CDCl$_3$ solution) of the present epoxy compound (A), it could be confirmed that epoxy ring is retained due to the methine peak (in the vicinity of 3.2 ppm) of epoxy ring and that the peak (in the vicinity of 3.6 ppm) of methoxy group has disappeared. Furthermore, gelation was not observed even after elapse of one month at room temperature.

EXAMPLE 2

7.5 parts of the epoxy group-containing silicon compound (A) obtained in Example 1, 7.5 parts of bisphenol A type epoxy resin (epoxy equivalent: 186 g/eq., Epikote 828 manufactured by Japan Epoxy Resin K.K.), and 4.1 parts of diaminodiphenylmethane were uniformly mixed to prepare the thermosetting resin composition of the present invention. The composition prepared was poured into an aluminium cup and heated at 60° C., 100° C., 150° C., and 190° C. successively for each 4 hours to obtain a cured product. Defects such as voids were not found in the resultant cured product.

EXAMPLE 3

100 parts of β-(3,4epoxycyclohexyl)ethyltrimethoxysilane and 100 parts of methyl isobutyl ketone were charged in a reaction vessel and heated to 80° C. After heating, 21.6 parts of 0.1% potassium hydroxide aqueous solution was continuously dropped in 30 minutes. After completion of dropping, reaction was continued for 5 hours at 80° C. while removing the resulting methanol. After completion of the reaction, washing was repeated until the used wash becomes neutral. Then the solvent was removed under reduced pressure to obtain 72 parts of the epoxy group-containing silicon compound (B) of the present invention. The epoxy equivalent of the resultant compound was 179 g/eq., and the weight average molecular weight thereof was 5600. From $^1$H-NMR (CDCl$_3$ solution) of the present epoxy compound (B), it could be confirmed that epoxy ring is retained due to the methine peak (in the vicinity of 3.2 ppm) of epoxy ring and that the peak (in the vicinity of 3.6 ppm) of methoxy group has disappeared. Furthermore, gelation was not observed even after elapse of one month at room temperature.

EXAMPLE 4

7.5 parts of the epoxy group-containing silicon compound (B) obtained in Example 3, 7.5 parts of bisphenol A type epoxy resin (epoxy equivalent: 186 g/eq., Epikote 828 manufactured by Japan Epoxy Resin K.K.), and 4.0 parts of diaminodiphenylmethane were uniformly mixed to prepare the thermosetting resin composition of the present invention. The composition prepared was cured in the similar way to Example 2 to obtain a cured product. Defects such as voids were not found in the resultant cured product.

EXAMPLE 5

67 parts of the epoxy group-containing silicon compound (C) of the present invention was obtained similarly to Example 1 except that 21.6 parts of 0.1% potassium hydroxide aqueous solution was changed to 10.8 parts of 0.1% sodium hydroxide aqueous solution in Example 1. The epoxy equivalent of the resultant compound was 169 g/eq., and the weight average molecular weight thereof was 3100. From $^1$H-NMR (CDCl$_3$ solution) of the present epoxy compound (C), it could be confirmed that epoxy ring is retained due to the methine peak (in the vicinity of 3.2 ppm) of epoxy ring and that the peak (in the vicinity of 3.6 ppm) of methoxy group has disappeared. Furthermore, gelation was not observed even after elapse of one month at room temperature.

EXAMPLE 6

10.0 parts of the epoxy group-containing silicon compound (C) obtained in Example 5, 5.5 parts of bisphenol A type epoxy resin (epoxy equivalent: 186 g/eq., Epikote 828 manufactured by Japan Epoxy Resin K.K.), and 4.4 parts of diaminodiphenylmethane were uniformly mixed to prepare the thermosetting resin composition of the present invention. The composition prepared was cured in the similar way to Example 2 to obtain a cured product. Defects such as voids were not found in the resultant cured product.

EXAMPLE 7

85 parts of γ-glycidoxypropyltrimethoxysilane, 7.9 parts of phenyltrimethoxysilane, and 92.9 parts of methyl isobutyl ketone were charged in a reaction vessel and heated to 80° C. After heating, 10.8 parts of 0.1% potassium hydroxide aqueous solution was continuously dropped in 30 minutes. After completion of dropping, reaction was continued for 5 hours at 80° C. while removing the resulting methanol. After completion of the reaction, washing was repeated until the used wash becomes neutral. Then the solvent was removed under reduced pressure to obtain 65 parts of the epoxy group-containing silicon compound (D) of the present invention. The epoxy equivalent of the resultant compound was 184 g/eq., and the weight average molecular weight thereof was 2900. From $^1$H-NMR (CDCl$_3$ solution) of the present epoxy compound (D), it could be confirmed that epoxy ring is retained due to the methine peak (in the vicinity of 3.2 ppm) of epoxy ring and that the peak (in the vicinity of 3.6 ppm) of methoxy group has disappeared. Furthermore, gelation was not observed even after elapse of one month at room temperature.

EXAMPLE 8

10.0 parts of the epoxy group-containing silicon compound (D) obtained in Example 7, 5.5 parts of bisphenol A type epoxy resin (epoxy equivalent: 186 g/eq., Epikote 828 manufactured by Japan Epoxy Resin K.K.), and 4.2 parts of diaminodiphenylmethane were uniformly mixed to prepare the thermosetting resin composition of the present invention. The composition prepared was cured in the similar way to Example 2 to obtain a cured product. Defects such as voids were not found in the resultant cured product.

EXAMPLE 9

66 parts of the epoxy group-containing silicon compound (E) of the present invention was obtained similarly to Example 1 except that 21.6 parts of 0.1% potassium hydroxide aqueous solution was changed to 11.5 parts of 0.5% potassium carbonate aqueous solution in Example 1. The epoxy equivalent of the resultant compound was 173 g/eq., and the weight average molecular weight thereof was 3200. From $^1$H-NMR (CDCl$_3$ solution) of the present epoxy compound (E), it could be confirmed that epoxy ring is retained due to the methine peak (in the vicinity of 3.2 ppm) of epoxy ring and that the peak (in the vicinity of 3.6 ppm) of methoxy group has disappeared. Furthermore, gelation was not observed even after elapse of one month at room temperature.

EXAMPLE 10

10.5 parts of the epoxy group-containing silicon compound (E) obtained in Example 9, 6.0 parts of bisphenol A type epoxy resin (epoxy equivalent: 186 g/eq., Epikote 828 manufactured by Japan Epoxy Resin K.K.), and 4.6 parts of diaminodiphenylmethane were uniformly mixed to prepare the thermosetting resin composition of the present invention. The composition prepared was cured in the similar way to Example 2 to obtain a cured product. Defects such as voids were not found in the resultant cured product.

EXAMPLE 11

67 parts of the epoxy group-containing silicon compound (F) of the present invention was obtained similarly to Example 1 except that 21.6 parts of 0.1% potassium hydroxide aqueous solution was changed to 11.5 parts of 0.5% sodium carbonate aqueous solution in Example 1. The epoxy equivalent of the resultant compound was 168 g/eq., and the weight average molecular weight thereof was 3400. From $^1$H-NMR (CDCl$_3$ solution) of the present epoxy compound (F), it could be confirmed that epoxy ring is retained due to the methine peak (in the vicinity of 3.2 ppm) of epoxy ring and that the peak (in the vicinity of 3.6 ppm) of methoxy group has disappeared. Furthermore, gelation was not observed even after elapse of one month at room temperature.

EXAMPLE 12

10.6 parts of the epoxy group-containing silicon compound (F) obtained in Example 11, 6.0 parts of bisphenol A type epoxy resin (epoxy equivalent: 186 g/eq., Epikote 828 manufactured by Japan Epoxy Resin K.K.), and 4.7 parts of diaminodiphenylmethane were uniformly mixed to prepare the thermosetting resin composition of the present invention. The composition prepared was cured in the similar way to Example 2 to obtain a cured product. Defects such as voids were not found in the resultant cured product.

EXAMPLE 13

33.1 parts of γ-glycidoxypropyltrimethoxysilane, 55.5 parts of phenyltrimethoxysilane, and 88.6 parts of methyl isobutyl ketone were charged in a reaction vessel and heated to 80° C. After heating, 11.4 parts of 0.1% potassium hydroxide aqueous solution was continuously dropped in 30 minutes. After completion of dropping, reaction was continued for 5 hours at 80° C. After completion of the reaction, washing was repeated until the used wash becomes neutral. Then the solvent was removed under reduced pressure to obtain 60.3 parts of the epoxy group-containing silicon compound (G) of the present invention. The epoxy equivalent of the resultant compound was 436 g/eq., and the weight average molecular weight thereof was 3400. From $^1$H-NMR (CDCl$_3$ solution) of the present epoxy compound (G), it could be confirmed that epoxy ring is retained due to the methine peak (in the vicinity of 3.2 ppm) of epoxy ring and that the peak (in the vicinity of 3.6 ppm) of methoxy group has disappeared. Furthermore, gelation was not observed even after elapse of one month at room temperature.

EXAMPLE 14

10 parts of the epoxy group-containing silicon compound (G) obtained in Example 13, 2.5 parts of bisphenol A type epoxy resin (epoxy equivalent: 186 g/eq., Epikote 828 manufactured by Japan Epoxy Resin K.K.), and 3.6 parts of diaminodiphenylmethane were uniformly mixed to prepare the thermosetting resin composition of the present invention. The composition prepared was cured in the similar way to Example 2 to obtain a cured product. Defects such as voids were not found in the resultant cured product.

EXAMPLE 15

41.4 parts of γ-glycidoxypropyltrimethoxysilane, 67.8 parts of β-(3,4epoxycyclohexyl)ethyltrimethoxysilane, and 54.6 parts of methyl isobutyl ketone were charged in a reaction vessel and heated to 80° C. After heating, 14.2 parts of 0.1% potassium hydroxide aqueous solution was continuously dropped in 30 minutes. After completion of dropping, reaction was continued for 5 hours at 80° C. After completion of the reaction, washing was repeated until the used wash becomes neutral. Then the solvent was removed under reduced pressure to obtain 78.2 parts of the epoxy group-containing silicon compound (H) of the present invention. The epoxy equivalent of the resultant compound was 177 g/eq., and the weight average molecular weight thereof was 4200. From $^1$H-NMR (CDCl$_3$ solution) of the present epoxy compound (H), it could be confirmed that epoxy ring is retained due to the methine peak (in the vicinity of 3.2 ppm) of epoxy ring and that the peak (in the vicinity of 3.6 ppm) of methoxy group has disappeared. Furthermore, gelation was not observed even after elapse of one month at room temperature.

EXAMPLE 16

10 parts of the epoxy group-containing silicon compound (H) obtained in Example 15, 5.7 parts of bisphenol A type epoxy resin (epoxy equivalent: 186 g/eq., Epikote 828 manufactured by Japan Epoxy Resin K.K.), and 4.3 parts of diaminodiphenylmethane were uniformly mixed to prepare the thermosetting resin composition of the present invention. The composition prepared was cured in the similar way to Example 2 to obtain a cured product. Defects such as voids were not found in the resultant cured product.

EXAMPLE 17

25 parts of γ-glycidoxypropyltrimethoxysilane, 75 parts of phenyltrimethoxysilane, and 100 parts of methyl isobutyl ketone were charged in a reaction vessel and heated to 80° C. After heating, 13.1 parts of 0.1% potassium hydroxide aqueous solution was continuously dropped in 30 minutes. After completion of dropping, reaction was continued for 5 hours at 80° C. while removing the resulting methanol. After completion of the reaction, washing was repeated until the used wash becomes neutral. Then the solvent was removed under reduced pressure to obtain 69 parts of the epoxy group-containing silicon compound (I) of the present invention. The epoxy equivalent of the resultant compound was 626 g/eq., and the weight average molecular weight thereof was 2400. From $^1$H-NMR ($CDCl_3$ solution) of the present epoxy compound (I), it could be confirmed that epoxy ring is retained due to the methine peak (in the vicinity of 3.2 ppm) of epoxy ring and that the peak (in the vicinity of 3.6 ppm) of methoxy group has disappeared. Furthermore, gelation was not observed even after elapse of one month at room temperature.

COMPARATIVE EXAMPLE 1

15 parts of bisphenol A type epoxy resin (epoxy equivalent: 186 g/eq., Epikote 828 manufactured by Japan Epoxy Resin K.K.), and 4.0 parts of diaminodiphenylmethane were uniformly mixed to prepare a thermosetting resin composition. The composition prepared was cured in the similar way to Example 2 to obtain a cured product.

[Heat Resistance Evaluation]

Figure 2:
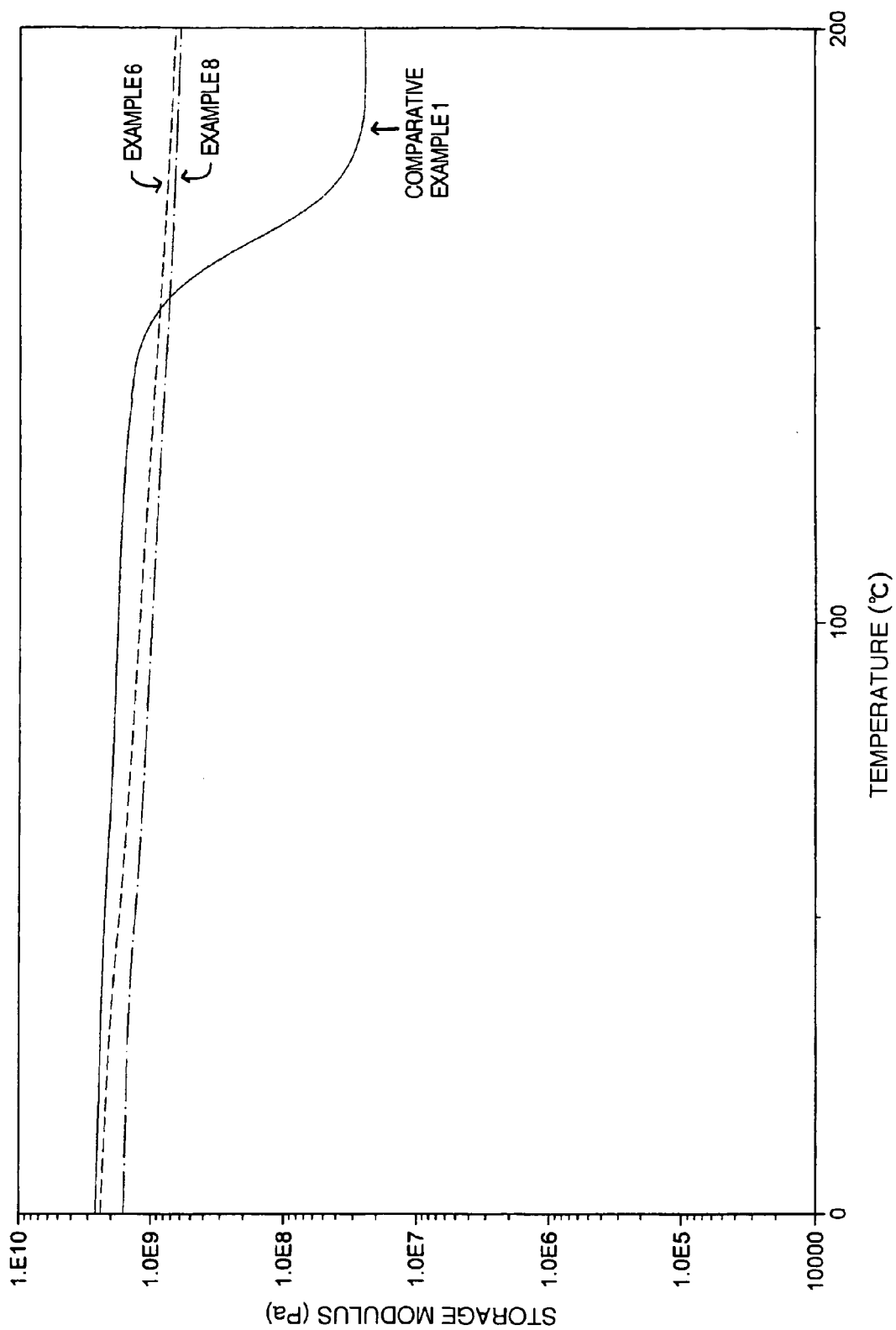
FIG. 2 shows evaluation results of heat resistance of the cured products obtained in Examples 6 and 8 and Comparative Example 1. The ordinate axis and transverse axis therein indicate dynamic storage elastic modulus and temperature, respectively.
Figure 3:
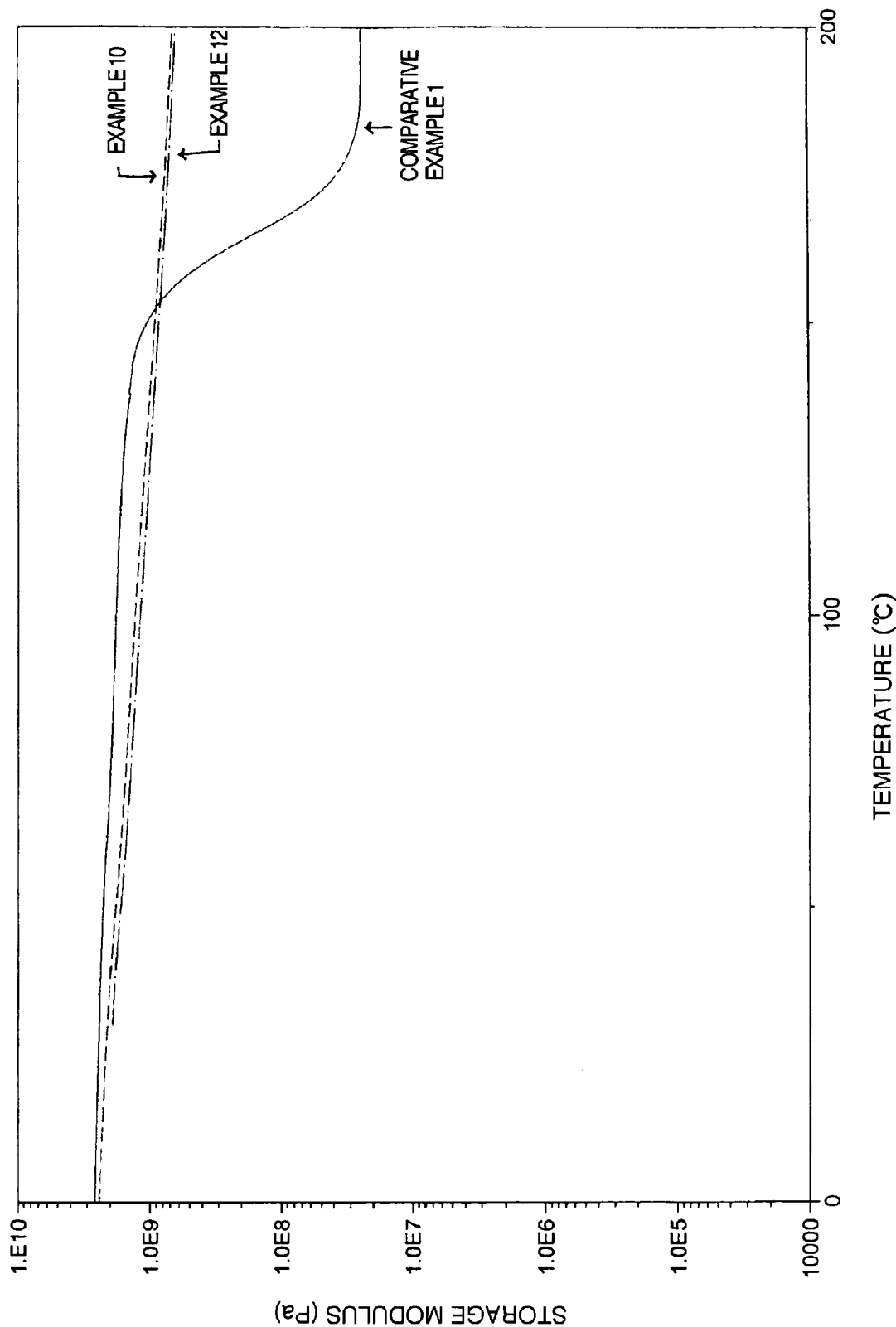
FIG. 3 shows evaluation results of heat resistance of the cured products obtained in Examples 10 and 12 and Comparative Example 1. The ordinate axis and transverse axis therein indicate dynamic storage elastic modulus and temperature, respectively.
Figure 4:
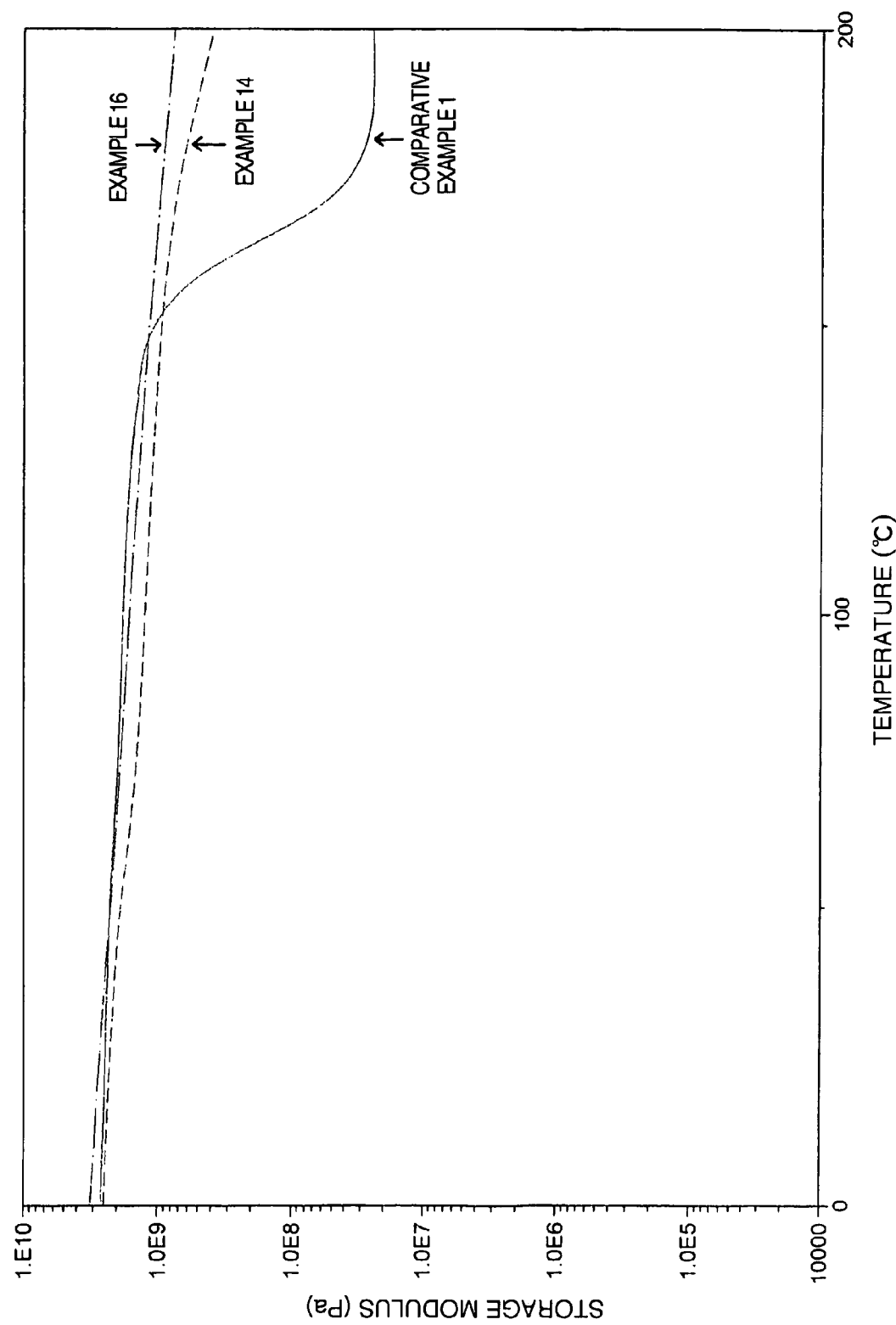
FIG. 4 shows evaluation results of heat resistance of the cured products obtained in Examples 14 and 16 and Comparative Example 1. The ordinate axis and transverse axis therein indicate dynamic storage elastic modulus and temperature, respectively.

The cured products obtained in Examples 2, 4, 6, 8, 10, 12, 14, 16 and Comparative Example 1 were shaped in a size of 4 mm width, 3 mm thickness, and 40 mm length, and dynamic storage elastic modulus was measured by use of a dynamic viscoelasticity measuring apparatus (DMA 2980 manufactured by TA Instruments Corporation, measurement conditions: amplitude 15 μm, frequency 10 Hz, and rate of temperature rise 2° C./min.) to evaluate heat resistance. Measurement results are shown in FIG. 1-4.

From FIG. 1-4, in Comparative Example 1 large decrease in elastic modulus is found in accordance with rising of temperature. On the other hand, in Examples 2, 4, 6, 8, 10, 12, 14, and 16 it is found that decrease of elastic modulus is low, elastic modulus at high temperature is high, and heat resistance is excellent. That is, as temperature passes 150° C., in the cured product of the Comparative Example elastic modulus decreases rapidly but in the cured products of the Examples the initial values are almost retained. This fact means that the cured product of the present invention exhibits no glass transition point and is excellent in heat resistance.

INDUSTRIAL USABILITY

By using the thermosetting resin composition containing the epoxy group-containing silicon compound of the present invention, remarkable improvement is found in elastic modulus at high temperature, and the cured product excellent in heat resistance can be obtained. The thermosetting resin composition of the present invention can be used as various insulating materials for electrical and electronic parts, printed wiring boards, laminated sheets such as high functionally copper-clad laminate, semiconductor encapsulating materials, various composite materials such as FRP (fiber-reinforced plastic), paints, adhesives, and coating agents. It provides the cured product excellent particularly in heat resistance, and hence has recently been extremely useful as a thermosetting resin composition which can apply to the lead-free solder in use.

The invention claimed is:

1. A method for producing an epoxy group-containing silicon compound, which comprises condensing at least one epoxy group-containing alkoxy silicon compound represented by the general formula (1a): $R_{1a}Si(OR_2)_3$, wherein $R_{1a}$ denotes a substituent having an epoxy group and $R_2$ denotes an alkyl group having at most 4 carbons, and at least one substituted alkoxy silicon compound represented by the general formula (1b): $R_{1b}Si(OR_3)_3$, wherein $R_{1b}$ denotes an alkyl group having at most 10 carbons, an aryl group or an unsaturated aliphatic residue and $R_3$ denotes an alkyl group having at most 4 carbons, in a solvent selected from the group consisting of dimethylformamide, dimethylacetamide, tetrahydrofuran, methyl ethyl ketone, and methyl isobutyl ketone in the presence of a basic catalyst.

2. The method as set forth in claim 1, wherein $R_{1a}$ is a glycidoxy(C1-C3)alkyl group or an alkyl group substituted with a cycloalkyl group of 5-8 carbons having an oxirane group in each of said at least one epoxy group-containing alkoxy silicon compound represented by the general formula (1a).

3. The method as set forth in claim 1, wherein $R_{1b}$ is an alkyl group having at most 6 carbons or an aryl group in each of said at least one substituted alkoxy silicon compound represented by the general formula (1b).

4. The method as set forth in claim 1, wherein $R_{1a}$ is a glycidoxy(C1-C3)alkyl group or an alkyl group substituted with a cycloalkyl group of 5-8 carbons having an oxirane group in each of said at least one epoxy group-containing alkoxy silicon compound represented by the general formula (1a), and wherein $R_{1b}$ is an alkyl group having at most 6 carbons or an aryl group in each of said at least one substituted alkoxy silicon compound represented by the general formula (1b).

* * * * *